United States Patent [19]

Jonner et al.

[11] Patent Number: 4,489,382
[45] Date of Patent: Dec. 18, 1984

[54] VEHICLE ANTI-SKID SYSTEM, AND METHOD OF BRAKE CONTROL

[75] Inventors: Wolf-Dieter Jonner, Beilstein; Wolfgang Korasiak, Ketsch; Heinz Leiber, Oberriexingen, all of Fed. Rep. of Germany

[73] Assignee: Robert Bosch GmbH, Stuttgart, Del.X

[21] Appl. No.: 469,741

[22] Filed: Feb. 26, 1983

[30] Foreign Application Priority Data

Mar. 15, 1982 [DE] Fed. Rep. of Germany ....... 3209369

[51] Int. Cl.³ ................................................. B60T 8/02
[52] U.S. Cl. ..................................... 364/426; 303/96; 303/110; 303/103; 303/92
[58] Field of Search .................. 364/426; 303/96, 110, 303/103, 92, 106, 111

[56] References Cited
U.S. PATENT DOCUMENTS 4,374,421 2/1983 Leiber ............................... 303/96 X Primary Examiner—S. J. Witkowski
Assistant Examiner—Saul M. Bergmann
Attorney, Agent, or Firm—Frishauf, Holtz, Goodman & Woodward

[57] ABSTRACT

To decrease the braking distance or braking path of a vehicle equipped with an automatic brake anti-lock or automatic anti-skid system, under unusual operating conditions in which the wheels on one side (right) are on a slippery surface, for example ice, and the wheels on the left side (L) of the vehicle are on a high-friction surface, for example clear roadway, without introducing excessive yaw during braking, pressure drop in the brake line at the low-friction side is sensed and braking pressure increased at the high-friction side after elapse of a predetermined timing interval, regardless of continued decreased braking pressure at the low-friction side; the increase in braking pressure at the high-friction side preferably occurs in pulses ($\Delta P$), the pulse lengths and pulse gaps of which are a function of vehicle speed (v).

18 Claims, 6 Drawing Figures

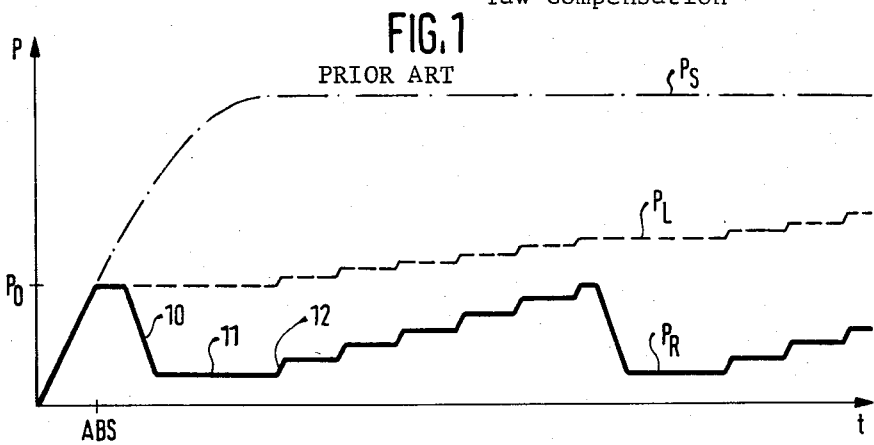
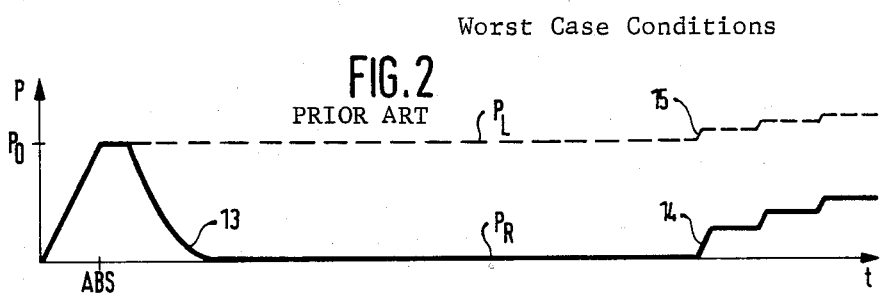
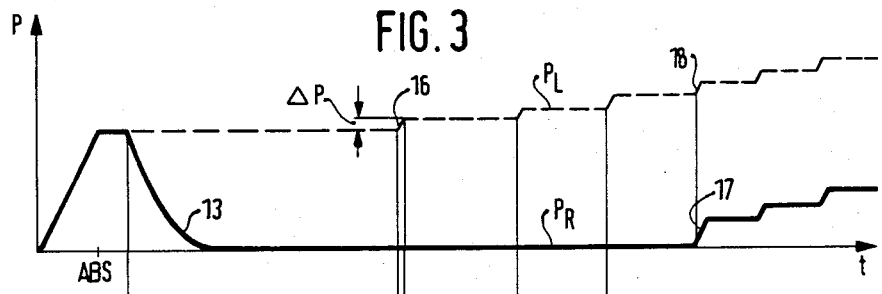
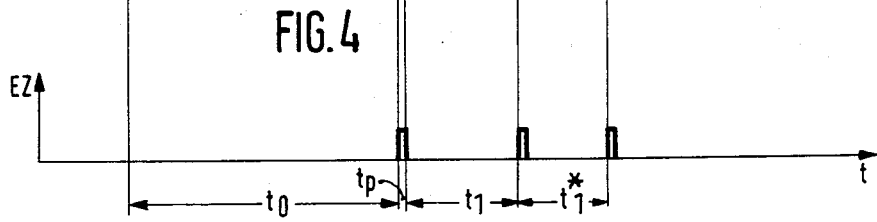

VEHICLE ANTI-SKID SYSTEM, AND METHOD OF BRAKE CONTROL

Reference to related patents:
U.S. Pat. No. 3,918,766, KLATT
U.S. Pat. No. 4,313,166, RODE et al
U.S. Pat. No. 4,320,459, LINDEMANN et al
U.S. Pat. No. 4,288,127, LEIBER, JONNER & GOEBELS.

The present invention relates to anti-skid systems for vehicles, and more particularly to anti-skid systems which prevent yawing of the vehicle if the wheels on one side of the vehicle are running on a surface having good wheel friction, whereas the wheels of the other side of the vehicle are running on a surface with low friction, for example on a patch of ice.

BACKGROUND

Anti-skid systems to control braking are well known, and the referenced U.S. patents describe various systems. Usually, wheel speed is sensed, and signals are derived therefrom, based on change of wheel speed, i.e. acceleration or deceleration, rate of change of deceleration, and the like. These signals, possibly combined with vehicle speed signals derived from extrapolation of previously derived vehicle speed signals, are then processed to provide control signals which control brake valves which, in turn, control the brakes of the respective wheels. The brakes are so controlled that the retardation or braking of the vehicle corresponds to that which the wheels can accept without skidding or slipping on the roadway on which they are running. Slip between the wheels and the roadway can be determined by sensing limit values of the control signals. The respective brakes of the wheels are then so controlled that, when the control signals reach or approach the limit values, indicating that the wheels tend to block, and hence may cause the vehicle to skid, braking pressure is relieved so that the wheels of the vehicle will run or turn just below the blocking limit.

If the roadway has highly asymmetrical friction with respect to the wheels, for example if the wheels on one side of the vehicle are on a dry or comparatively high-friction surface of the roadway, whereas the wheels on the other side of the vehicle are on a highly slippery surface, for example a patch of ice, a track of snow, or the like, application of braking pressure to the wheels of the vehicle may cause the vehicle to yaw. Substantial yawing torques may be applied. These yawing torques are torques which tend to rotate the vehicle about a vertical axis, since the wheels which are braked and which run on the high-friction surface area of the roadway tend to delay the vehicle substantially at that side, whereas the wheels which are on the slippery side of the roadway have no retardation effect on the vehicle. Such yawing torques are particularly dangerous when applied to trucks and, the longer the wheel base of the vehicle, the more pronounced will be the yawing if highly differential frictional conditions occur between the right and left sides of the vehicle as it is being braked.

It has previously been proposed to prevent the occurrence of high yawing torques by controlling the brakes at the side of the vehicle which have the high-friction contact with the road surface as a function of retardation or braking on the side having the low frictional value. Thus, it has been proposed not to drop the braking pressure at the side with high frictional value, but also not to increase it until an increase in braking pressure can be tolerated at the side having the low road friction value. This, however, reduces braking effectiveness at the side with the high road friction value, and the actual braking pressure is increased only in a predetermined value to the possible braking effects from the low road friction side. While this system is effective to reduce yawing, the braking length is increased, since braking at the high road friction side is lowered based on braking at the low road friction side.

An anti-skid system in which the high road friction side braking is controlled as a function of braking effort on the low road friction side is described in the referenced German Patent Disclosure Document DE-OS No. 28 30 809 to which U.S. Pat. No. 4,288,127, Leiber, Jonner and Goebels, corresponds.

Under extreme, almost "worst case" road conditions, particularly if the road friction differences between the tracks on which the wheels of respective sides of the vehicle are running are extreme, the braking distance may become excessively long. Also, remanent braking torques on the vehicle side having the low road friction value may interfere with proper operation; such difficulty may be caused by increased friction in bearings of the wheels, brakes which do not release exactly as commanded by the braking pressure, but have remanent adhesive friction and the like. The interaction of difficulties which can arise in braking under such conditions may interfere with proper build-up of braking pressure at the brakes of the side of the vehicle which has its wheels running on a high road friction track range of the roadway.

THE INVENTION

It is an object to provide an anti-skid system in which the advantages of prevention of yawing as known in prior systems are retained without, however, unduly extending the braking distance of the vehicle.

Briefly, a timing circuit is provided for timing the duration of pressure drop at the wheel of lower road friction coefficient. If the pressure drop at that wheel exceeds a predetermined timing interval $t_0$ an override control signal $E_Z$ is generated which causes application of braking pressure increase in the wheel brakes having the higher road friction coefficient; subsequently, and when braking pressure is to be increased in both the brakes of the wheels at lower and higher road friction, the increase is commanded to occur in synchronism.

The system has the advantage that a reasonable compromise between minimum yawing torques and short braking distance is obtained, since the braking distance is decreased by application of braking pressure after elapse of the time interval $t_0$ while, still, preventing excessive application of braking pressure at the side of the vehicle which runs over the high road friction coefficient region of the roadway.

Instrumentation of the improved system is simple; for example, the timing control signals can be easily obtained by monitoring the control signals applied to respective brake valves, and controlling application or release of braking pressure. For example, the timed occurrence of braking signals for the brake pressure, and brake release pressure at the side of the vehicle operating at the low friction coefficent zone of the roadway can be monitored, and used for comparison with a timing circuit which, itself, may have a variable timing interval in dependence on vehicle speed. Thus, the control of braking pressure can be matched to various driving situations and conditions. In accordance with a preferred feature of the invention, thus, vehicle speed is used to determine the timing interval.

DRAWINGS

FIG. 1 is a graph illustrating braking pressure $P_S$ applied by a brake controller, and actual braking pressure applied to the left vehicle side, $P_L$, and to the right vehicle side, $P_R$, in accordance with the prior art, and utilizing yaw compensation;

FIG. 2 is a graph similar to FIG. 1 illustrating pressure relations in accordance with the prior art, under worst-case conditions;

FIG. 3 illustrates braking pressure, under worst-case conditions, in accordance with the present invention;

FIG. 4 is a graph illustrating timing signals, and drawn in alignment with FIG. 3;

DETAILED DESCRIPTION

FIG. 1 shows the brake pressure P with respect to time t on the abscissa. Let it be assumed that the operator of the vehicle applies the brake. At a certain time instant, as determined by the anit-skid or anti-brake lock system, shown schematically at instant ABS, the anit-skid system will become effective. The braking pressure commanded by the operator, shown in the chain-dotted line $P_S$, will no longer be effective. Rather, a predetermined braking pressure $P_O$, at a constant value, will be applied to the brakes on both the right side and the left side of the vehicle.

Figure 5:
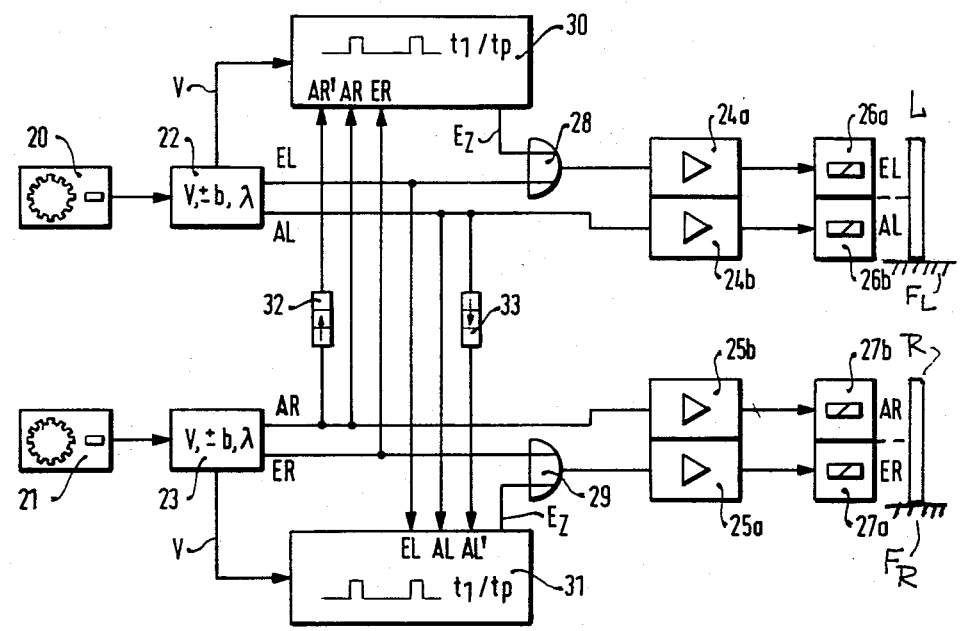
FIG. 5 is a block diagram of an embodiment of the anti-skid system in accordance with the invention.

Let it be assumed, next, that the right side of the vehicle is on a surface with a very low road friction coefficient, for example on ice or snow, or the like; the left side of the vehicle, however, is on a surface which has a substantially coefficient of friction between wheel and road surface, for example on a track which is free from snow and ice, and thus provides, for example, good frictional engagement between the tires of the wheels and the road surface. The pressure applied to the right wheel is shown in the solid line $P_R$; the pressure applied to the left wheel, on the high-friction surface is shown in the broken line $P_L$. FIG. 5 shows the wheels L and R, on a road, with friction $F_L$, $F_R$.

As can be seen from FIG. 1, the pressure $P_R$ for the right side of the vehicle drops sharply at 10, then continues in a constant pressure phase, and is then gently increased at 12, in steps, based on pulses generated by a pulse generator, as known. In order to prevent yaw torques applied to the vehicle, systems have been proposed in the prior art in which the pressure on the left or high-friction side is first maintained at a constant level and then, in steps as in steps 12, is increased in accordance with the gradual increase in pressure at the right side of the vehicle. Preferably, the steps of pressure increase at the left side, as shown in the curve $P_L$, are smaller than the steps 12 of pressure increase on the right side. If the pressure at the right side of the wheels increases to the point where slippage is again detected, the pressure will then again drop—see curve portion 10a—and the cycle will repeat.

FIG. 2 illustrates the pressure relationships under extremely poor or worst-case conditions, that is, under conditions in which the differential frictional coefficients under the wheels of the right side and of the left side is extremely high. At point 13, the pressure $P_R$ at the right side of the vehicle drops practically to zero. This is a condition, for example, under which the right of the wheel is above a sheet of ice, or any other extremely slippery surface. Any braking of the right side of the wheel will cause immediate slippage, and therefore no increase in braking pressure will occur so that, consequently, the pressure $P_L$ at the left side of the vehicle will remain constant until there is a pressure rise again at the right side, as indicated by the curve portion 14 of the solid-line curve $P_R$. This pressure rise causes a consequent pressure rise 15 at the left wheels, although in smaller increments.

As a result of this operation of the control system, an unduly long braking distance for the vehicle will result.

An override control is provided, operating as illustrated in FIGS. 3 and 4. A timing period is started after the automatic brake anti-lock system becomes effective. During this timing period, the braking pressure at the right side is checked to determine if the braking pressure $P_R$ remains dropped or, in other words, that no increase in braking pressure results. A maximum timing period $t_0$ is provided and, even if no increase in braking pressure at the right side occurs, an override signal is applied to the left side to increase the braking pressure by a small amount $\Delta P$ when the time $t_0$ has elapsed. An override or command control signal $E_Z$ (FIG. 5) is generated. The signal $E_Z$ is a pulse signal having a clock period $t_p/t_1$, wherein $t_p$ defines the pulse duration, and $t_1$ the pulse gap, that is, the time between sequential signal pulses $E_Z$—see FIG. 3. The pulses $E_Z$, see FIG. 4, cause increase in braking pressure in steps $\Delta P$ on the left side of the vehicle. In the usual anti-skid systems, increase in braking pressure is generated by opening the pressure fluid inlet valve between a source of pressurized braking fluid, for example compressed air, hydraulic fluid, and the like, and the brake operating mechanism, while leaving the exhaust or drain valve from the brake mechanism closed. The pressure rise $\Delta P$ is, thus, proportional to the time period $t_p$. It is, of course, also possible to use a different timing control rather than that commanded by the ratio $t_p/t_1$ to command different pressure rise relationships $\Delta P$.

The increase in the pressure $P_L$—see FIG. 3—on the left side of the vehicle will continue until the usually commanded increase in pressure at the right side of the vehicle—see curve portion 17—occurs. From this period of time on, the pressure $P_L$ on the left side will rise as shown by the curve portion 18, controlled by the pressure $P_R$ on the right side of the vehicle, and as well known and customary in such systems which are in use, and described in prior publications.

The result will be a substantial decrease in the braking distance due to the effectiveness of braking at the high road friction side. Yaw, however, does not substantially increase. A more efficient braking, without tendency to yaw, is thus obtained.

In accordance with a preferred embodiment of the invention, the time $t_1$ or $t_p$, or both, are preferably matched to speed of the vehicle, so that matching of the respective time periods to specific operating situations is obtained. FIG. 4, schematically, illustrates this by the time periods $t_1$ and $t^*_1$. In accordance with a preferred feature, $t_p$ is inversely proportional to vehicle speed, and $t_1$ is proportional to vehicle speed.

The control system which is capable of so overriding the normal operation of a brake anti-lock system is shown in schematic block diagram from in FIG. 5, in which all elements not necessary for an understanding of the present invention have been omitted; the respective blocks can be of any standard construction, for example as explained in detail in the referenced patents and the German Patent Disclosure Document, or corresponding equivalent publications. The specific structures are all known, and any suitable equivalents to those specifically referred to may be used.

Referring to FIG. 5: Two identical channels are provided, one each for the left and for the right side of the vehicle. The channel for the left side of the vehicle includes a speed sensor 20 which controls a signal processing circuit 22. Signal processing circuit 22 provides signals to amplifier and control circuits 24a, 24b for the left pressure entrance valves EL 26a and, respectively, for the left pressure drain or outlet valve AL, shown schematically at 26b. The channel at the right side of the vehicle has corresponding circuits 23 and amplifier and control circuits 25b, 25a, controlling respective valves 27a, 27b for entrance of pressurized fluid at the right side, ER and drain or outlet at the right side, AR, respectively.

The signal processing circuits 22, 23 receive the following signals: vehicle speed v; vehicle acceleration $+b$; vehicle deceleration $-b$; slip $\lambda$, and generate corresponding signals which are indicated by the capital letters EL, AL, ER, AR, respectively, for the inlet or entrance valves at the left and right side of the vehicle, and the drain or outlet valves at the left and right side of the vehicle, applied over the corresponding control circuits 24a, 24b, and 25a, 25b.

In order to provide for commanded increase of braking pressure on the wheel operating on the roadway or track with the higher wheel friction coefficient, OR-gates 28, 29 are provided in the lines controlling pressurized brake fluid supply or inlet. The gates 28, 29 are connected in advance of the respective command circuits 24a, 25a. The OR-gates 28, 29 have a second input which is the command override signal $E_Z$, generated by pulse generators 30, 31, respectively. Pulse generator 30, at the left side of the vehicle, receives the right drain signals AR. In accordance with the invention, and to insure synchronized pulses increase of pressure at the right and left wheels, the pulse generator 30 also receives the right inlet signal ER. A signal AR', which is conducted over a timing circuit 32 and which occurs only if the signal AR has a time duration which is longer than the time duration $t_0$. The timing circuit 32 provides for the timing period $t_0$. Corresponding symmetrical connections are provided from the left side of the vehicle to the pulse generator 31 for the right vehicle side, including, again, a timing circuit 33 which provides the timing interval $t_0$. Both of the pulse generators 30, 31 additionally receive a vehicle speed signal v which can be provided by the signal processing circuits 22, 23. The signal processing circuits, themselves can be in accordance with any suitable well known construction.

Figure 6:
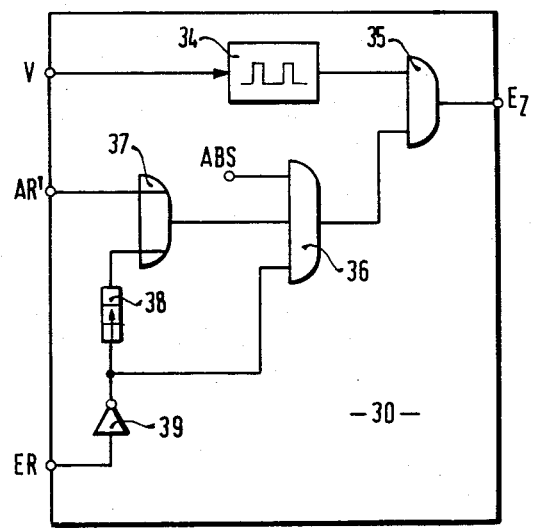
FIG. 6 is a detailed diagram of a pulse generator, used in the embodiment of the system of FIG. 5.

The pulse generator 30, 31 generate a pulse sequence having a duty cycle $t_1/t_p$. FIG. 6 illustrates a suitable circuit. The pulse sequence with the duty cycle $t_1/t_p$ is generated by a pulse generator 34, the duty cycle $t_1/t_p$ being controlled by the signal v. The pulse sequence of the pulse generator 34 is applied to the output $E_Z$ over an AND-gate 35, the second input of which is derived from a three-input AND-gate 36. The three inputs of the AND-gate 36 receive a signal ABS, which is representative of the anti-brake lock system becoming effective; an output signal from an OR-gate 37, and further the output signal from an inverter 39 which receives the brake pressure inlet signal ER. The inverter 39 is further connected through a timing circuit 38 which, likewise, has a timing interval of the period $t_0$ to one input of the OR-gate 37, the second input to which is connected to the signal AR'.

Operation: Pulses from the pulse generator 34 are supplied to the output $E_Z$ and OR-gate 28 only if the AND-gate 36 is enabled. AND-gate 36 is enabled if:

(a) the brake anti-lock system is in operation—signal ABS; and (b) (i) an AR' signal is present, or (ii) no ER signal after $t_0$ is present (signal from OR-gate 37);

(c) no braking pressure increase at the right side of the vehicle having the low frictional coefficient—see curve portion 17, FIG. 3—is commanded. The third condition insures subsequent pressure increase in synchronism with both sides of the vehicle yet positively prevents pressure increase at the wheel of higher friction other than by application of pulses from generator 34 after the time lapse of circuit 38.

The OR-gate 37 thus recognizes that the braking pressure at the side of the vehicle having the low frictional coefficient has decreased for an excessively long time, in that either the outlet valve has been opened for too long a period—signal AR'—or that the increase of braking pressure has not occurred within the requisite time period, due to the inverted signal ER, and timing circuit 38.

Of course, other types of circuitry can be used which similarly, logically, interrelate the respective signals. The circuit of FIG. 6 is illustrative of a preferred suitable example, utilizing a minimum number of reliable, readily available components.

Operation of the system of FIG. 5: The circuit of FIG. 5, including the pulse generators 30, 31, as shown in FIG. 6, thus will recognize, due to presence of the timing circuits 32, 33, that the outlet valve at the side of the vehicle on the slippery surface has been opened for too long, so that the braking pressure at the right side of the vehicle has dropped for too long a time. This criterion, or the excessively long failure to receive a pressure rise signal at the right side, that is, a signal ER then causes the pulse signals of the pulse generator 30 to be applied through and AND-gate 36 to generate the signal $E_Z$ which, in turn, is applied through the respective OR-gate 28, 29 to the pressure inlet channel of the side of the vehicle which is operating over the high-friction coefficient surface. The pressure is thus raised in the high-friction coefficient side, with a duty cycle of $t_1/t_p$ to cause successive increase in braking pressure therein, as illustrated in connection with FIGS. 3 and 4.

Various changes and modifications may be made within the scope of the inventive concept.

We claim:

1. Anti-brake lock or anti-skid system for a vehicle having right (R) and left (L) sides;

wheel speed sensors (20, 21) associated, respectively, with right and left wheels of the vehicle and providing right and left wheel speed signals;

signal processing means (22, 23) receiving the right and left wheel speed signals and generating wheel behavior signals representative of wheel acceleration, deceleration, and wheel slip $(+b, -b, \lambda)$;

right and left wheel brake control circuits (24a, 24b; 25a, 25b) connected to and controlled by the signal processing means and controlling wheel brake pressure (P), in accordance with the differential values of right and left wheel behavior, as represented by the wheel behavior signals, and preventing occurrence of vehicle yaw by holding the braking pressure ($P_L$) of the wheel having the higher road friction coefficient of the wheels on the two sides of the vehicle constant, when the brake pressure ($P_R$) of the wheel having the lower road friction coefficient is decreased and held constant and 2.) increasing it ($P_L$) thereafter in synchronism with a pulsed increase of the braking pressure ($P_R$) of the wheel having the lower road friction coefficient and comprising,
means for decreasing the braking distance comprising means (32, 33, 38) for timing the duration of pressure drop ($P_R$, 13) at the wheel of the lower road friction coefficient and generating an override control signal ($E_Z$) if said time duration exceeds a predetermined timing interval ($t_0$),
said override control signal being applied to control pulsed increase of the wheel brake pressure ($P_L$) in the wheel having the higher road friction coefficient until the wheel brake pressure is increased in synchronism for both wheels.

2. System according to claim 1, wherein the wheel brake control circuit (24a, 24b; 25a, 25b) is responsive to control increase (EL, ER) and decrease (AL, AR) of braking pressure in the respective right and left (R, L) wheels;
and wherein the means for generating the override control signal ($E_Z$) comprises means (39) for suppressing application of the override control signal to increase wheel brake pressure upon sensing an increase in wheel braking pressure consequent to response of the signal processing means (22, 23) commanding increase in braking pressure (EL, ER).

3. System according to claim 2
wherein the means for generating an override signal includes means (32, 33) comparing the time duration of decrease of braking pressure with said predetermined timing interval ($t_0$), and for generating said override control signal if decrease of braking pressure persists longer than said predetermined timing interval.

4. System according to claim 2
wherein the means for generating the override control signal comprises
means (38) for comparing said predetermined timing interval ($t_0$) with the time of occurrence of control of braking pressure in an increasing direction of the wheel having the lower braking pressure, and generating said override control signal ($E_Z$) if no increase in braking pressure at said wheel having the lower pressure is sensed prior to elapse of said timing interval.

5. System according to claim 2, wherein the means for generating the override control signal ($E_Z$) includes a pulse generator (30, 31; 34) applying increased brake pressure in pulses or steps ($\Delta P$) with a predetermined pulse duty cycle ($t_1/t_p$).

6. System according to claim 3, wherein the pulse duty cycle and the pressure steps are controllable as a function of vehicle speed, as derived from wheel speed signals (z).

7. System according to claim 4, wherein the wheel speed signals (z) control the duty cycle ($t_1/t_p$) to increase with increasing speed of the vehicle.

8. Method of controlling a vehicle anti-brake lock or anti-skid system, wherein the vehicle has right and left (R, L) wheels;
wheel speed sensors (20, 21) are provided associated, respectively, with the right and left wheels, and providing right and left wheel speed signals;
signal processing means (22, 23) receiving the right and left wheel speed signals and generating wheel behavior signals representative of wheel acceleration and deceleration, and wheel slip (+b, −b, λ);
left and right wheel brake control circuits (24a, 24b; 25a, 25b) are connected to and controlled by the signal processing means, and controlling wheel brake pressure (P), and sensing differential values of the right and left wheel behavior signals, and preventing occurrence of vehicle yaw by limiting the braking pressure ($P_L$) of the wheel having the higher road friction coefficient of the two wheels, comprising, the steps of
sensing if the time duration, during which braking pressure is decreased in the wheels having the lower road friction coefficient, exceeds a predetermined time interval ($t_0$);
and increasing the braking pressure in the wheel having the higher road friction coefficient at the elapse of said predetermined timing interval if said decreased braking pressure condition persists beyond said predetermined timing interval and until the braking pressure is increased, in synchronism, for both wheels.

9. Method according to claim 8, wherein the step of increasing the braking pressure in the wheel having the higher road friction coefficient comprises increasing the braking pressure in steps in accordance with a command function;
and inhibiting increase of braking pressure in the wheel of the higher road friction coefficient in accordance with said commanded function upon sensing an increase of braking pressure ($P_R$) in the wheel having the lower road friction coefficient prior to expiration of said time interval.

10. Method according to claim 9, wherein the step of increasing the braking pressure in the wheel having the higher road friction coefficient comprises increasing said braking pressure in incremental steps ($\Delta P$).

11. Method according to claim 9, including the step of sensing vehicle speed (v);
and controlling the duration of said incremental steps, and hence the pressure rise during said incremental steps, as a function of vehicle speed.

12. Method according to claim 9, including the step of sensing vehicle speed (v) and controlling the intervals ($t_1$, $t^*_1$) as a function of vehicle speed.

13. Method according to claim 11, including the step of sensing vehicle speed (v) and controlling the intervals ($t_1$, $t^*_1$) as a function of vehicle speed.

14. Method according to claim 9, wherein decrease of vehicle braking pressure is controlled by brake pressure drop signals (AL, AR);
and wherein the step of sensing if the time duration during which braking pressure is decreased comprises sensing if the brake pressure decrease signal (AL, AR) of the wheel having the lower road friction coefficient exceeds said predetermined timing interval ($t_0$).

15. Method according to claim 8, wherein increase of vehicle braking pressure is controlled by brake pressure increase signals (EL, ER);

and wherein the step of sensing if the time duration during which braking pressure is decreased comprises the step of sensing if a brake pressure increase signal (EL, ER) occurs before elapse of said predetermined timing interval ($t_0$).

16. Method according to claim 15, wherein increase of vehicle braking pressure is controlled by brake pressure increase signals (EL, ER);

and wherein the step of sensing if the time duration during which braking pressure is decreased comprises the step of sensing if a brake pressure increase signal (EL, ER) occurs before elapse of said predetermined timing interval ($t_0$).

17. Method according to claim 16, wherein the step of increasing the braking pressure in the wheel having the higher road friction coefficient comprises increasing said braking pressure in incremental steps ($\Delta P$).

18. Method according to claim 14, wherein the step of increasing the braking pressure in the wheel having the higher road friction coefficient comprises increasing said braking pressure in incremental steps ($\Delta P$).

* * * * *

UNITED STATES PATENT AND TRADEMARK OFFICE
CERTIFICATE OF CORRECTION

PATENT NO. : 4,489,382
DATED : December 18, 1984
INVENTOR(S) : Wolf-Dieter Jonner, et al.

It is certified that error appears in the above-identified patent and that said Letters Patent is hereby corrected as shown below:

On the title page, Item (73) Assignee: should read
--Robert Bosch GmbH, Stuttgart, Fed. Rep. Germany--.
Claim 6, column 7, line 65, change "claim 3" to
--claim 5--;
Claim 16, column 9, line 9, change "claim 15" to
--claim 9--;
Claim 18, column 10, line 8, change "claim 14" to
--claim 15--.

Signed and Sealed this

Thirteenth Day of August 1985

[SEAL]

Attest:

DONALD J. QUIGG

Attesting Officer    Acting Commissioner of Patents and Trademarks